3,779,970
THICKENED LATEX COATINGS WITH IMPROVED FLOW AND LEVELING PROPERTIES
Syamalarao Evani and Robert H. Lalk, Midland, Mich., assignors to The Dow Chemical Company, Midland, Mich.
No Drawing. Filed Mar. 13, 1972, Ser. No. 234,393
Int. Cl. C08f 41/02, 41/12
U.S. Cl. 260—29.6 RW                    12 Claims

ABSTRACT OF THE DISCLOSURE

The improvements of this invention are obtained by adding to a latex coating a water soluble salt of a polymeric material which is an ester of a carboxylic polymer having about 28 to 62.5 weight percent of pendant carboxylic acid groups (—COOH) and certain nonionic surfactants wherein about 0.5 to 10 percent of the acid groups are esterified with the surfactant.

BACKGROUND OF THE INVENTION

This invention relates broadly to aqueous coating compositions which are commonly referred to as latex coatings or latex paints and which contain emulsions or dispersions of water insoluble vinyl addition polymers as the principal film-forming component. The invention particularly relates to thickened latex formulations containing a water soluble salt of a polymeric material which provides improved flow and leveling properties.

A great variety of polymeric materials, natural and synthetic, have been taught by the art to be useful thickening agents, yet only a few of these materials find commercial use today. Even those which are used commercially, such as hydroxyethyl cellulose or methyl cellulose, do not provide both the thickening power required as well as the flow and leveling desired in the formulation. Consequently, in order to meet the market demands for improved paint formulations, it is important to find new materials which will provide the above combination of properties.

SUMMARY OF THE INVENTION

The above advantages and benefits are obtained according to this invention by employing a water soluble salt of a particular polymeric material as the thickening agent in latex coatings, especially pigmented latex paints, whereby the additional and unexpected properties of improved flow and leveling are also obtained.

The polymeric material contains a small number of ester groups pendant from the polymer backbone. It is important to the invention that the esterifying moiety be a monohydroxyl containing nonionic surfactant and that the hydrophobic group of the surfactant be spaced apart from the polymer backbone by a hydrophilic polyethylene oxide (polyoxyethylene) chain having at least about 10 oxyethylene units in the chain. In addition, the nonionic surfactant should have an HLB of at least about 12, preferably about 14.

The polymeric material is an ester of a carboxylic polymer having about 28 to 62.5 weight percent of pendant carboxylic acid (—COOH) groups and a molecular weight of at least about 30,000. About 0.5 to 10 percent of said acid groups are esterified with the nonionic surfactant and the remaining acid groups are converted to water solubilizing salt groups. Preferably the carboxylic polymer has about 28 to 50 weight percent of said acid groups.

A sufficient amount of the thickening agent is employed to provide the latex coating with a viscosity of about 80 to 140 K.V. (Kreb units). Pigments may also be added to the latex coating in amounts from 0 up to a pigment volume concentration of about 65 percent. Preferably the latex coating is pigmented and has a pigment volume concentration of about 15 to 65 percent.

DESCRIPTION

A principal object of this invention is to provide latex coating compositions with improved flow and leveling properties, especially pigmented latex paints. Other objects and benefits will be apparent from the following description of the invention.

The term leveling is commonly understood to refer to the ability of the applied coating to form a smooth film in which imperfections left by the applicator, such as a brush or roller, disappear during the drying process. The term flow generally refers to the spreadability of the coating and to the ease with which the coating can be applied. Both of these terms will be employed in the description of this invention with the above commonly understood meanings.

Important also to a latex coating and its applicability is its viscosity wherein it desirable that it have sufficient viscosity so that the applied coating does not sag or drip but at the same time excessive viscosities should be avoided so that the thickener does not adversely affect the flow properties. Usually the coating formulator must compromise some of the above properties in order to obtain the best balance of properties.

Numerous patents have proposed certain polymeric materials as capable of providing these properties but almost without exception such materials have not been found commercially acceptable. U.S. 3,514,421 claims the use of polyvinyl alcohol having certain amounts of acetal groups. For example, metal salts of polyanionic materials are proposed in U.S. 3,026,281 and U.S. 3,022,940 claims certain mixtures of polymeric salts derived from anhydride containing polymers.

Additionally there are numerous patents which claim polymeric materials for use as thickening agents in a variety of stystems including latex paints, such as U.S. 2,921,930; U.S. 3,499,876 and U.S. 3,301,829.

The coating formulations of this invention essentially comprise (1) a binder which is an aqueous emulsion or dispersion of a water insoluble, film-forming vinyl addition polymer and (2) a water soluble salt of a polymeric material which is both a thickening agent and a flow and leveling agent. Optionally, but preferably, the latex coatings also contain a pigment or a mixture of pigments in an amount from 0 up to a pigment volume concentration of about 65 percent. Preferably the pigment and binder are combined in proportions such as to provide a pigment volume concentration of about 15 to 65 percent and to provide the finished coating formulation with at least about 45 weight percent of total solids.

Pigment volume concentration (PVC) is a commonly understood term to the latex paint formulator and is defined as the volume ratio of the pigment per the combined volume of the pigment plus the volume of the film-forming binder solids. This ratio will vary depending on the type of latex paint. It is preferred to formulate to a PVC of about 15 to 25 percent for glass latex paints; a PVC of about 35 to 45 for exterior latex paints; and a PVC of about 40 to 55 for interior latex paints.

As indicated the finished latex coating should contain at least about 45 weight percent of total solids. The total solids may range up to about 65 percent, but preferably is between about 50 to 55 percent. The upper limit is usually a practical limit imposed by the physical characteristics of the binder emulsion or dispersion.

The amount of the polymeric material added for thickening and for flow and leveling ranges between about 0.2 to 2 weight percent based on the weight of binder solids, and pigment solids when present, but the amount added should be sufficient to provide the finished latex coating with a viscosity of about 80 to 140 K.U. (Kreb units). This viscosity is routinely measured by means of a Stormer viscometer which is well known to the art.

Pigments of all kinds are well known to the art. Briefly, pigments include white opacifying pigments such as titanium dioxide (rutile or blends of rutile and anatase), zinc oxide, lithopone and the like; extender pigments such as kaolin clay, calcium carbonate, talc, mica, barium sulfate, silica, or calcium or magnesium silicates; color pigments (inorganic, metal organic and organic types) including chrome yellows, Prussian blues, Brunswick greens, zinc sulfide and the like; and modifying pigments such as attapulgite clay, bentonite clay, hydrophobic clays, diatomaceous silicas, colloidal silicas or silicates and the like.

The latex is understood to include an aqueous emulsion or dispersion of a water insoluble, film-forming vinyl addition polymer together with any added water, solvents, emulsifiers, surfactants and the like employed in its preparation. The vinyl addition polymer solids content may vary widely but most commercially available latexes contain from about 45 to 55 weight percent polymer solids.

Films-forming latexes suitable for formulating latex paints are commercially available from numerous manufacturers. While a great diversity of water insoluble vinyl addition polymer emulsions may be prepared the invention is especially well suited with the three major classes of latexes, i.e. the "acrylics," the "styrene copolymers" and the "vinyl esters," although the invention is not limited thereto.

By "acrylics" it is meant to include copolymers composed of the esters of acrylic and methacrylic acid such as methyl, ethyl, propyl, butyl, 2-ethylhexyl, cyclohexyl, dodecyl and the like esters. Minor amounts of a variety of other monomers may be employed for specific purposes. It is possible also to include smaller amounts of monomers such as acrylic acid, methacrylic acid, itaconic acid, hydroxyalkyl acrylates and methacrylates and the like provided the amount employed is insufficient to impart water solubility. The presence of the latter monomers frequently imparts better dispersibility and stability to the latex among other advantages and purposes.

"Styrene copolymers" refer to the class of latexes which are composed of copolymers of styrene with comonomers such as esters of acrylic and methacrylic acids and the jugated diolefins such as butadiene, isoprene, chloroprene and the like. Copolymers of styrene and butadiene in varying proportions are particularly well known. Styrene can be replaced in part or totally by vinyl aromatic monomers such as vinyl toluene, $\alpha$-methyl styrene, chloro substituted styrene, alkyl substituted styrenes and the like. In addition, varying amounts of other monomers may also be employed such as itaconic acid, acrylonitrile, methacrylonitrile, acrylic acid, methacrylic acid and the like. Monomers, containing water solubilizing groups may be employed in small amounts provided the amount is insufficient to impart water solubility.

A third well known class of latexes, called "vinyl esters," is typified by vinyl ester polymers and copolymers of which the best known is polyvinyl acetate. Other monomers of this class include vinyl propionate, vinyl benzoate, vinyl stearate and the like. Copolymers of vinyl esters and $\alpha$-olefins such as ethylene are also well known. Minor amounts of other monomers may also be employed such as a copolymer of vinyl acetate and small amounts of acrylic or methacrylic acid.

The above description of latexes is not meant to be all inclusive but only descriptive of the many kinds of water insoluble, film-forming vinyl addition polymer latexes which may be prepared. The latexes are conveniently and generally prepared by emulsion polymerization methods which are well known and fully described in the art. It is not considered necessary to detail herein such preparative methods since the invention relates to latex coatings and not to the preparation of the latex, itself.

Most essential to the invention is the particular polymeric material employed to provide both thickening and flow and leveling properties. The polymeric material is an ester of a carboxylic polymer having about 28 to 62.5 weight percent of pendant carboxylic acid (—COOH) groups and a molecular weight of at least about 30,000 and said surfactant. Carboxylic polymers with a higher molecular weight up to about 300,000, preferably about 150,000 to 300,000 are especially useful. Preferably the carboxylic polymer has about 28 to 50 weight percent of said acid groups. About 0.5 to 10 percent of said carboxylic acid groups are esterified with certain nonionic surfactants and the remainder of the acid groups provide the water solubilizing salt groups when neutralized with a base such as ammonia. In addition to ammonia other bases such as amines, hydroxyl amines, alkali metal bases and the like may be used.

Important to the invention is the choice of the nonionic surfactant employed to form the ester. While there is no intent to limit the invention to any theory as to why the particular polymeric materials function as they do, it is believed that the nature of the hydrophobic group of the surfactant and the distance by which it is separated from the backbone of the polymeric material are important in providing the improved flow and leveling properties as well as thickening power to the latex paint.

The nonionic surfactant may be generally described by the formula, $HO$—$(CH_2CH_2O)_n$—$R$. It has been found that useful surfactants must have an average value for $n$ of at least about 10, preferably at least about 20 and most preferred of about 40. The number of these oxyethylene units, —$CH_2CH_2O$—, determines the distance of separation between the hydrophobic group R and the polymer backbone. The polyoxyethylene chain (polyglycol chain) provides the surfactant with its hydrophilic properties. It has also been found that the surfactant hydrophobic group R and the polyoxyethylene chain should provide the surfactant with a HLB of at least 12. Preferably the HLB is about 14 or higher.

HLB is well known to the art as a measure of the hydrophile-lipophile balance (hence the abbreviation, HLB) of a surfactant. In general a low number characterizes the surfactant as oil-loving and, conversely, a high number as water-loving. A method for its determination has been described numerous times in technical and trade publications. (See Am. Perfumer Essent. Oil Revue, 65, No. 5, 26–9, 1955; J. Soc. Cosmetic Chemists 1, 311–326, 1949; and U.S. 3,423,351.)

The hydrophobic group, R, of the surfactant may be a residue of a fatty product, synthetic or natural, such as a fatty acid, fatty alcohol and the like; an alkaryl group such as the alkylated phenols where the alkyl group may have about 8 to 18 carbon atoms, e.g. nonyl phenol, dodecyl phenol, and the like; or any of a variety of well-known hydrophobic residues. However, it is preferred to employ surfactants with an alkaryl group of the nonylphenol type. "Nonionic Surfactants," vol. 1, edited by M. J. Schick (published by M. Decker, Inc., New York, 1967) may be consulted for a description of the many types of nonioic surfactants and different hydrophobic groups.

The carboxylic polymer which is esterified may be prepared by directly polymerizing a vinyl carboxylic acid monomer, such as acrylic acid, or a mixture of same with any of a variety of copolymerizable monomers such as styrene to provide about 28 to 62.5 weight percent of pendant —COOH groups. The carboxylic polymer is then esterified by standard esterification procedures with the nonionic surfactant to convert about 0.5 to 10 percent of the —COOH groups to ester groups. Typical vinyl carboxylic acid monomers include acrylic acid, methacrylic acid, itaconic acid, maleic acid and the like or the anhydrides thereof which are equivalent herein. A variety of copolymerizable monomers may be employed such as alkenyl aromatic (styrene, α-methyl styrene, vinyl toluene and the like), acrylic and methacrylic acid esters and the like.

Alternately, the esterified carboxylic acid polymer may be prepared directly by including in the monomer mixture an appropriate amount of a nonionic surfactant ester of a vinyl carboxylic acid monomer, the general preparation of which is disclosed in U.S. 3,341,627.

Conveniently, the polymeric materials may be prepared by esterification of a polymer containing reactive anhydride groups followed by hydrolysis of unreacted anhydride groups to form carboxylic acid groups. For example an equimolar copolymer of styrene-maleic anhydride may be reacted with a nonionic surfactant to form half ester groups. The unreacted anhydride groups may then be hydrolyzed in water to carboxylic acid groups or may be hydrolyzed in the presence of a base to directly form water solubilizing salt groups. When the styrene-maleic anhydride is hydrolyzed in the presence of ammonia as the base the water solubilizing group formed is the half amide ammonium salt. Amines with active hydrogens react similarly. Said half amide salt groups are water solubilizing salt groups as the term is used herein. In place of maleic anhydride there may be used aconitic anhydride, citraconic anhydride, itaconic anhydride and the like. Likewise styrene may be replaced in part or totally by other alkenyl aromatic monomers such as vinyl toluene, α-methyl styrene, alkylated styrenes and the like.

Such anhydride containing copolymers are well known. For use in this invention it is preferred to employ copolymers of alkenyl aromatic monomers and unsaturated dicarboxylic acid anhydrides in the mole proportions of about 1:1 to 2:1, respectively, and preferably the equimolar copolymers. Especially useful are the styrene-maleic anhydride copolymers.

Esters of anhydride copolymers and their preparation are described in U.S. 2,921,930 and U.S. 3,301,829, although the preparative methods disclosed in U.S. 3,301,829 are not operative with copolymers such as styrene-maleic anhydride. In particular the aqueous solvent systems disclosed therein do not produce an esterified polymer useful in this invention. It has been found necessary to conduct the esterification reaction in an organic solvent such as methyl ethyl ketone and advantageously to employ a tertiary amine catalyst.

As the molecular weight of the carboxylic base polymer decreases it is desirable to employ a nonionic surfactant with a longer polyoxyethylene chain and to increase the percent of ester groups. Conversely, as the molecular weight increases surfactants with a shorter polyoxyethylene chain may be used and the percent of ester groups may be decreased. Generally, it is desirable to employ higher molecular weight carboxylic base polymers to prepare the thickening agents of this invention, i.e. molecular weights of about 150,000 up to 300,000.

The invention will be further illustrated by the following non-limiting examples. All parts and percentages will be by weight unless otherwise specified.

The general procedure used was to thoroughly mix the water soluble polymeric material with the latex and then let the mixture stand overnight before measuring its properties. Viscosity was measured by a Stormer viscometer which had been previously standardized for measurement directly in Kreb units (K.U.) and by a Brookfield viscometer. Brushability was determined by using a 2" paint brush (100% tapered nylon bristles) to spread about 20 grams of the paint formulation over a 1' x 2' area on a vertical sealed surface. Resistance to brushing was noted as high, moderate or low brush drag. Likewise film build was rated as excellent, good, moderate and low. Flow and leveling was determined by taking a 8½" x 11" center area from the painted surface and visually rating it for removal (disappearance) of brush marks by flow out and leveling by a numerical rating from 1 to 10 with a rating of 1 being poor and 10 being excellent. The cellulosic thickeners generally produce a flow and leveling rating of about 2 to 4. All of the above tests are reproducible and a skilled paint formulator can routinely use the tests to quite accurately evaluate the performance of a paint.

EXAMPLE 1

Preparation of a water soluble polymeric thickener

A styrene-maleic anhydride copolymer (SMA) was dissolved in methyl ethyl ketone (MEK) to form a 10–20% solution in a resin kettle equipped with an agitator, reflux condenser, thermometer and heating mantle. The solution was heated to reflux and the required amount of surfactant to form the ester was added. The mixture was allowed to reflux for 16 hours and then the solution was devolatilized at 80° C. in a vacuum oven for 5 hours. The polymer was then ground up. A 5 to 10% salt solution of the polymeric ester was made by dispersing the polymer in water and neutralizing it with 1.75 moles of ammonia or sodium hydroxide per mole of anhydride forming the ammonium half amide salt or the sodium salt, respectively.

EXAMPLE 2

Preparation of a water soluble polymeric thickener

Another method employed was to dissolve a styrene-maleic anhydride copolymer (SMA) in MEK to form a 30–35% solution in a kettle similar to the above and heated to reflux. The required amount of a surfactant and a catalyst (triethylamine or pyridine) as a 50% solution in MEK was added (mole ratio of surfactant/tertiary amine was 1/1). The solution was heated at 80° C. for 1–4 hours and then devolatilized at 50° C. under vacuum as before or on a drum drier. The polymer was ground and then made into aqueous salt solutions similar to Example 1.

EXAMPLE 3

Aqueous 5% polymeric thickener solutions made according to Example 1 using ammonia to neutralize the polymeric ester were evaluated for thickening efficiency by addition to a styrene-butadiene latex paint base of the following composition.

Pigment grind: Lbs./100 gals.
    Water _____ 115
    Dispersant [1] _____ 8
    Titanium dioxide _____ 190
    $CaCO_3$ _____ 250
    Preservative [2] _____ 2
    Silicone defoamer _____ 2

Paint let-down:
    Water _____ 75
    Defoamer [3] _____ 4
    SB latex (67:33; 55% solids) _____ 262

Thickener:
    Thickener solution plus water 278.

[1] Sodium salt of a low M.W. polymeric carboxylic acid (Tamol 731, 25%).
[2] 1-(3-chloroallyl)-3,5,7-triaza-1-azoniaadamantane (Dowicil 100).
[3] Proprietary defoamer (Hodag PV–108).

The SMA copolymers used were equal molar copolymers of different molecular weights.

The viscosity of the SMA polymer was determined on a 10% solution of the copolymer in MEK at 25° C. The relationship of viscosity to molecular weight is as follows:

M.W.
2.5 cps. _____ 30,000–40,000
8 cps. _____ 150,000–200,000
20 cps. _____ 300,000–400,000

The tests, tabulated below, were made primarily to evaluate thickening efficiency and show that thickening increased with (1) increase in molecular weight of the SMA copolymer, (2) increase in the percent of acid groups esterified and (3) increase in the number of oxyethylene units in the polyoxyethylene chain of the surfactant. However, to obtain the flow and leveling advantages of this invention and a proper balance in all the properties of the total formulation without causing excessive viscosity and/or instability it has been found necessary to limit the percent of esterification to about 0.5–10% of the carboxylic acid groups, employ a surfactant with a polyoxyethylene chain having at least about 10 oxyethylene units per chain and an HLB of at least 8. The results of the thickening tests are tabulated below.

EXAMPLE 8

An acrylic latex paint formulation was prepared from the following materials.

Pigment grind: Lbs./100 gals.
- Water — 125
- Potassium tripolyphosphate — 4
- Polypropylene glycol (1200 M.W.) — 8
- Preservative (Dowicil 100) — 2
- Titanium dioxide — 200
- $CaCO_3$ — 257
- Ethylene glycol — 15

Paint let-down:
- Acrylic latex (Rhoplex AC-34, 46%) — 387

Thickener:
- Thickener solution plus water — 178

TABLE I.—THICKENED STYRENE-BUTADIENE LATEX FORMULATIONS

| Test number | SMA copolymer, visc., cps. | Nonionic surfactant Type[1] | Wt./10 gm. of SMA | HLB | Percent COOH HLB esterfied[2] | Gms. of 5% thickener per 150 gms. of latex | Brookfield viscosity cps[3] |
|---|---|---|---|---|---|---|---|
| A | 2.5 | 9N10 | 1.10 | 14 | 2.5 | 12 | 750 |
| B | 2.5 | 9N10 | 2.2 | 14 | 5 | 12 | 2,160 |
| C | 2.5 | 9N10 | 4.4 | 14 | 10 | 11 | 5,400 |
| D | 2.5 | 9N20 | 2.75 | 16 | 2.5 | | |
| E | 2.5 | 9N20 | 5.5 | 16 | 5 | | |
| F | 2.5 | 9N40 | 5 | 17.8 | 2.5 | 1.6 | 5,680 |
| G | 8 | 9N10 | 1.15 | 14 | 2.5 | 12 | 1,400 |
| H | 8 | 9N10 | 2.2 | 14 | 5 | 11 | 4,400 |
| I | 8 | 9N20 | 2.75 | 16 | 2.5 | | |
| J | 8 | 9N20 | 5.5 | 16 | 5 | | |
| K | 8 | 9N40 | 5 | 17.8 | 2.5 | | |
| L | 20 | 9N10 | 1.15 | 14 | 2.5 | 11 | 7,640 |
| M | 20 | 9N20 | 2.75 | 16 | 2.5 | | |
| N | 20 | 9N40 | 5 | 17.8 | 2.5 | | |
| O | 8 | (4) | 0.88 | 9.7 | 2.5 | 10 | <400 |
| P | 8 | 12 P 15 | 2.3 | 14.3 | 2.5 | 1.8 | 5,280 |
| Q | 2.5 | 12 P 15 | 2.3 | 14.3 | 2.5 | 4.5 | 6,240 |
| R | 2.5 | 12 P 6 | 2.6 | 10.7 | 5.0 | 15 | 240 |
| S | 2.5 | | | | 0 | 12 | 600 |
| T | 8 | | | | 0 | 12 | 700 |
| U | 20 | | | | 0 | 12 | 1,120 |
| V | 8 | (5) | 0.7 | 5.3 | 2.5 | 15 | ~240 |

[1] 9N4=nonyl phenol condensed with 4 moles of ethylene oxide; 9N10=nonyl phenol condensed with 10 moles of ethylene oxide; 9N20=nonyl phenol condensed with 20 moles of ethylene oxide; 9N40=nonyl phenol condensed with 40 moles of ethylene oxide; 12 P 6 dodecyl phenol condensed with 6 moles of ethylene oxide; 12 P 15 dodecyl phenol condensed with 15 moles of ethylene oxide; lauryl 4EO lauryl alcohol condensed with 4 moles of ethylene oxide; cetyl 2EO cetyl alcohol condensed with 2 moles of ethylene oxide; stearyl 2EO stearyl alcohol condensed with 2 moles of ethylene oxide.
[2] Theoretical based on weight of reactants.
[3] No. 5 spindle at 50 r.p.m.
[4] Lauryl 4EO.
[5] Cetyl 2EO.

EXAMPLE 4

Similar to Example 3 SMA thickener solution D (see Table I) was added to the styrene-butadiene latex formulation to provide 12.8 lbs. of active thickener/100 gals. of paint. The viscosity of the paint was 92 K.U. The paint had good film build and brush drag and a flow and leveling rating of 9.

A conventional methyl cellulose thickener was added to the styrene-butadiene latex formulation (5.5 lbs. of active thickener/100 gals.) with a resultant viscosity of 78 K.U. This paint had poor film build, low brush drag and a flow and leveling rating of 4.

EXAMPLE 5

Example 4 was repeated using thickener solution F at 13 lbs. of active thickener/100 gals. The paint viscosity was 98 K.U., had good film build and had a flow and leveling rating of 9.

EXAMPLE 6

Example 4 was repeated using thickener solution K at 6 lbs./100 gal. The paint had a viscosity of 100 K.U., good film build and a flow and leveling rating of 6.

EXAMPLE 7

Example 4 was repeated using thickener solution L at 3.8 lbs./100 gal. The paint had a viscosity of 93 K.U., good film build and a flow and leveling rating of 8.

The thickener employed was solution N at 3 lbs./100 gals. The paint had a viscosity of 102 K.U., excellent film build and a flow and leveling rating of 9.

For comparison a conventional methyl cellulose thickener used in place of solution N at 5 lbs./100 gals. resulted in a paint viscosity of 96 K.U. The paint had poor film build and a flow and leveling rating of 2. When solution N was used at the same rate of 5 lbs./100 gal. the paint had a viscosity of 138 K.U. and a flow and leveling rating of 9.

EXAMPLE 9

Similar to Example 8 the following thickener solutions were used.

| Solution | Lbs./100 gals. | Paint viscosity | Flow and leveling |
|---|---|---|---|
| F | 15 | 109 | 9 |
| K | 8 | 99 | 9 |
| K | 12 | 123 | 9 |
| M | 10 | 115 | 9 |

The above flow and leveling ratings are greatly superior to those which can be obtained with the commercially used thickeners, i.e. a rating of about 4 to 5 at best.

EXAMPLE 10

A polyvinyl acetate latex paint formulation was prepared from the following materials.

| Pigment grind: | Lbs./100 gals. |
|---|---|
| Water | 200 |
| Dispersant (Tamol 731, 25%) | 8 |
| Preservative (Dowicil 100) | 1.25 |
| Ethylene glycol | 25 |
| Titanium dioxide | 250 |
| $CaCO_3$ | 100 |
| Kaolin clay (ASP400) | 125 |
| Paint let-down: | |
| Latex (Everflex E, 51%) | 250 |
| Defoamer (Nopco NDW) | 2 |
| Thickener: | |
| Thickener solution and water | 187.75 |

The thickener employed was solution K at 5 lbs./100 gals. and the paint had a viscosity of 93 K.U. and a flow and a leveling rating of 7. For comparison, a similar paint formulation thickened with methyl cellulose at 5 lbs./100 gals. had a viscosity of 83 K.U. and a flow and leveling rating of 4.

EXAMPLE 11

An equal molar styrene-maleic anhydride copolymer (8 cps.) was reacted with a surfactant (9N40 type, see Table I) in the proportion of 100/50 grams, respectively, in the presence of 2.5 grams of triethylamine as a catalyst according to the procedure of Example 2. The resulting polymeric ester was drum dried and then 10% aqueous solutions were made by neutralizing the polymeric ester with ammonium hydroxide in one case and sodium hydroxide in another case.

EXAMPLE 12

Similar to Example 11 a polymeric ester was made by reacting 100 grams of SMA with 25 grams of the 9N40 type surfactant in the presence of 1.25 grams of triethylamine.

EXAMPLE 13

A thickened styrene-butadiene latex paint was prepared similar to Example 3 using the aqueous sodium salt thickener solution of Example 11 at 4 lbs./100 gals. The paint had a viscosity of 97 K.U., good brush drag and film build and a flow and leveling rating of 6–7.

EXAMPLE 14

The aqueous sodium salt thickener solution of Example 11 was used to thicken an acrylic latex paint prepared from the following materials.

| Pigment grind: | Lbs./100 gals. |
|---|---|
| Water | 125 |
| Dispersant (Tamol 731, 25%) | 8 |
| Polypropylene glycol (1200 M.W.) | 8 |
| Preservative (Dowicil 100) | 2 |
| Titanium dioxide | 200 |
| $CaCO_3$ | 257 |
| Ethylene glycol | 15 |
| Octylphenoxy polyethoxyethanol (Triton X–100) | 6.5 |
| Paint let-down: | |
| Acrylic latex (Rhoplex AC–35, 40%) | 387 |
| Thickener: | |
| Thickener solution plus water | 167.5 |

The resulting paint thickened at 2.5 lbs./100 gals. had a viscosity of 122 K.U., a good film build and a flow and leveling rating of 9. Similar results were found when the thickener solutions neutralized with ammonium hydroxide were used.

EXAMPLE 15

An acrylic semi-gloss latex paint was thickened with the sodium salt of the thickener prepared according to Example 11 at 3 lbs./100 gals. The paint was prepared from the following materials.

| Pigment grind: | Lbs./100 gals. |
|---|---|
| Water | 105 |
| Dispersant (Tamol 731, 25%) | 11 |
| Defoamer (Nopco NDW) | 2 |
| Titanium dioxide | 275 |
| Paint let-down: | |
| Preservative (Dowicil 100) | 1.25 |
| Water | 20 |
| Propylene glycol | 32 |
| Coalescing agent (Dalpad A) | 10 |
| Defoamer (Nopco NDW) | 4 |
| Dioctyl sodium sulfosuccinate (Triton GR–7) | 2 |
| Nonylphenoxy polyethoxyethanol (Igepal CO–890) | 1 |
| Acrylic latex (Rhoplex AC–490, 46.5%) | 590.5 |
| Thickener: | |
| Thickener solution plus water | 64.25 |

The paint had a viscosity of 118 K.U., good film build and a flow and leveling rating of 8–9. When the same paint was thickened with methyl cellulose at 3 lbs./100 gals. the flow and leveling rating was 6–7.

EXAMPLE 16

An acrylic semi-gloss latex was prepared similar to Example 15 using the sodium salt of the thickener prepared according to Example 12 at 6 lbs./100 gals. The paint had a viscosity of 101 K.U. and a flow and leveling rating of 9. Similar results were obtained with the polymeric thickener of Example 12 neutralized with ammonium hydroxide.

EXAMPLE 17

A 2.5 cps. styrene-maleic anhydride copolymer (2:1 molar ratio) was reacted with a 9N40 type surfactant according to Example 1 (85:15 grams, respectively) and a 5% ammonium salt solution of the polymeric ester was made. A styrene-butadiene latex paint was prepared similar to Example 3 except that the thickener added consisted of 1.5 parts of ethylene glycol, 2.5 parts of water and 2 parts of the above thickener solution per 50 parts of the pigmented latex. The paint had very good brushability and flow and leveling similar to previous examples.

EXAMPLE 18

Polymeric ester thickeners may also be made directly as follows. A monomer mixture containing 0.95 mole of styrene, 1 mole of maleic anhydride and 0.05 mole of a 9N40 type surfactant ester of methacrylic acid were polymerized in methyl ethyl ketone at 80° C. for 5 hours under a nitrogen atmosphere in the presence of 0.5% (based on total weight of monomers) of azodiisobutyronitrile as a catalyst. The polymer was recovered by devolatilization of the solvent and then made into a 10% aqueous solution by neutralization with sodium hydroxide. The thickener was then used to prepare a thickened acrylic latex paint similar to Example 14 by adding 8 lbs./100 gals. of the polymeric ester thickener. The paint had a viscosity of 108 K.U. and flow and leveling similar to the previous examples.

EXAMPLE 19

A polymeric ester was prepared similar to Example 18 by polymerizing a mixture of styrene, methacrylic acid and the 9N40 type surfactant ester of methacrylic acid (mole ratio 0.35:0.6:0.05) using 0.5% of azobisisobutyronitrile as the catalyst. The polymerization was conducted at 80° C. for 5 hours under a nitrogen atmosphere and the polymeric ester recovered by devolatilization of the solvent. A 10% aqueous solution was prepared by neutralizing with soduim hydroxide.

An acrylic latex paint was prepared similar to Example 14 with the above polymeric ester at 4 lbs./100 gals. The paint had a viscosity of 110 K.U. and flow and leveling similar to the previous examples.

What is claimed is:

1. A thickened latex coating having improved flow and leveling properties and a viscosity of about 80 to 140 Kreb units, said coating comprising an aqueous dispersion of a water insoluble, film-forming vinyl addition polymer, a dispersed pigment in proportions such that the pigment volume concentration ranges from 0 to about 65 percent and a sufficient amount of a thickening agent to provide said viscosity wherein the thickening agent is a water soluble salt of a copolymer of an alkenyl aromatic monomer and an unsaturated acid anhydride in the mole proportions of 1:1 to 2:1 respectively, wherein the copolymer has a molecular weight of at least about 30,000 and wherein about 0.5 to 10 percent of the acid groups are esterified with a monohydroxyl containing nonionic surfactant having an HLB of at least about 12 and a polyoxyethylene chain with at least about 10 oxyethylene units.

2. A latex paint according to claim 1 having a pigment volume concentration of about 15 to 65 percent.

3. A latex coating according to claim 1 wherein the mole proportions in said copolymer are 1:1.

4. A latex coating according to claim 1 wherein said copolymer has a molecular weight of about 150,000 to 300,000.

5. A latex coating according to claim 1 wherein said surfactant has about 20 to 40 oxyethylene units in the polyoxyethylene chain.

6. A latex coating according to claim 1 wherein said surfactant has an HLB of about 14 to 18.

7. A thickened latex paint having improved flow and leveling properties and a viscosity of about 80 to 140 Kreb units, said coating comprising an aqueous dispersion of a water insoluble, film-forming vinyl addition polymer, a dispersed pigment in proportions such that the pigment volume concentration ranges from 0 to about 65 percent and a sufficient amount of a thickening agent to provide said viscosity wherein the thickening agent is a water soluble salt of a copolymer of an alkenyl aromatic monomer and an unsaturated acid anhydride in the mole proportions of 1:1 to 2:1, respectively, wherein the copolymer has a molecular weight of at least about 30,000 and wherein about 0.5 to 10 percent of the acid groups are esterified with a surfactant having the formula $R\text{-}(CH_2CH_2O)_n OH$ where R is an alkaryl group having 8 to 18 carbons in the alkyl group and where $n$ is 10 or greater.

8. A latex paint according to claim 7 wherein said copolymer contains the alkenyl aromatic monomer and the unsaturated dicarboxylic acid anhydride in the mole proportions of 1:1.

9. A latex paint according to claim 7 wherein said polymer is a styrene-maleic anhydride copolymer.

10. A latex paint according to claim 7 wherein the value for $n$ is about 20 to 40.

11. A latex paint according to claim 7 wherein said copolymer has a molecular weight of about 150,000 to 300,000.

12. A latex paint according to claim 1 wherein said copolymer is a styrene-maleic anhydride copolymer.

References Cited

UNITED STATES PATENTS

| 3,580,880 | 5/1971 | Clarke et al. | 260—29.6 R |
|---|---|---|---|
| 3,637,566 | 1/1972 | De S. Deex et al. | 260—29.6 TA |
| 3,639,325 | 2/1972 | Marion et al. | 260—29.6 |
| 3,652,480 | 3/1972 | Coker et al. | 260—29.6 TA |

WILLIAM H. SHORT, Primary Examiner

E. A. NIELSEN, Assistant Examiner

U.S. Cl. X.R.

117—161 UC